United States Patent [19]

Bales et al.

[11] 4,082,352

[45] Apr. 4, 1978

[54] SEAT BACK RECLINER

[75] Inventors: Emmett R. Bales; Randal T. Murphy, both of Morristown, Tenn.

[73] Assignee: Lear Siegler, Inc., Morristown, Tenn.

[21] Appl. No.: 759,205

[22] Filed: Jan. 13, 1977

[51] Int. Cl.[2] .............................................. A47C 1/025
[52] U.S. Cl. .................................... 297/364; 16/144; 297/367; 297/379
[58] Field of Search ............................... 297/363–367, 297/373, 379, 355; 16/144, 143, 147, 145

[56] References Cited

U.S. PATENT DOCUMENTS

| | | | |
|---|---|---|---|
| 3,008,765 | 11/1961 | Tischler et al. | 297/367 |
| 3,309,139 | 3/1967 | Turner et al. | 297/367 |
| 3,737,946 | 6/1973 | Giuliani | 297/367 X |
| 3,788,698 | 1/1974 | Perkins | 297/367 |
| 3,840,268 | 10/1974 | Johndrow et al. | 297/367 X |
| 3,926,474 | 12/1975 | Johndrow et al. | 297/367 X |

FOREIGN PATENT DOCUMENTS 2,364,754  8/1974  Germany ............................ 297/367

*Primary Examiner*—Roy D. Frazier
*Assistant Examiner*—William E. Lyddane

*Attorney, Agent, or Firm*—Reising, Ethington, Barnard, Perry & Brooks

[57] ABSTRACT

A seat back recliner having seat back and cushion arms connected to each other about a pivotal axis for adjustable movement. Plate-like ends of the arms are pivotally connected to each other with a locking ring therebetween fixed to the seat back arm encircling the pivotal axis. Locking teeth of the ring extend inwardly and are arranged in an arcuate shape about the pivotal axis to be engaged by a toothed end of a locking dog that is slidable between the plate ends and between spaced guides on the seat cushion arm end. A spring biased actuator and cam normally position the dog in a locking position where its toothed end engages the ring teeth to prevent pivoting of the seat back arm. A blocking pin on the dog and a blocking surface on the seat back arm cooperate to prevent engagement of the dog and the ring during pivoting of the seat back arm to the easy-enter position. The blocking surface of the seat back arm end is preferably provided by an arcuate slot through which the blocking pin on the dog extends, and the blocking pin on the dog is preferably located adjacent the toothed dog end.

14 Claims, 10 Drawing Figures

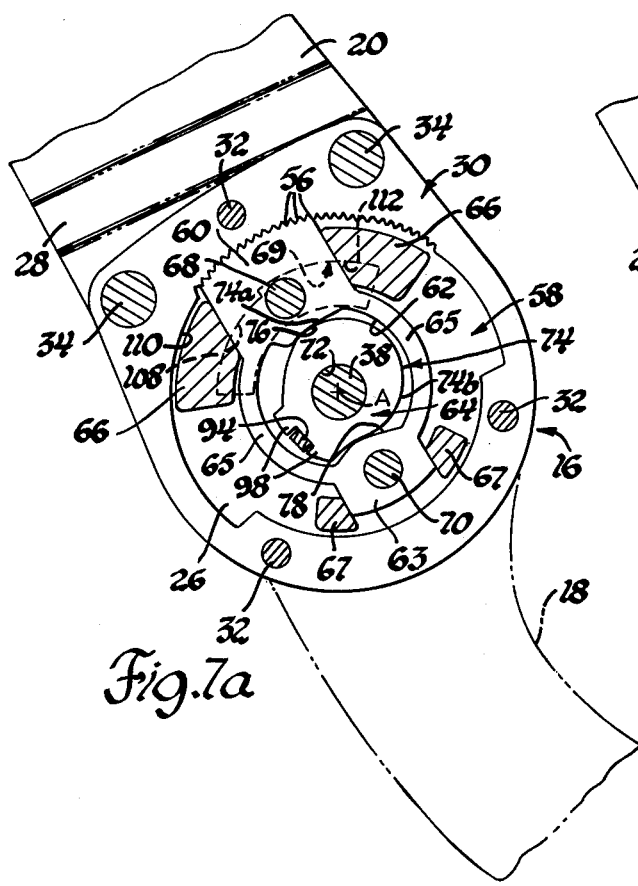
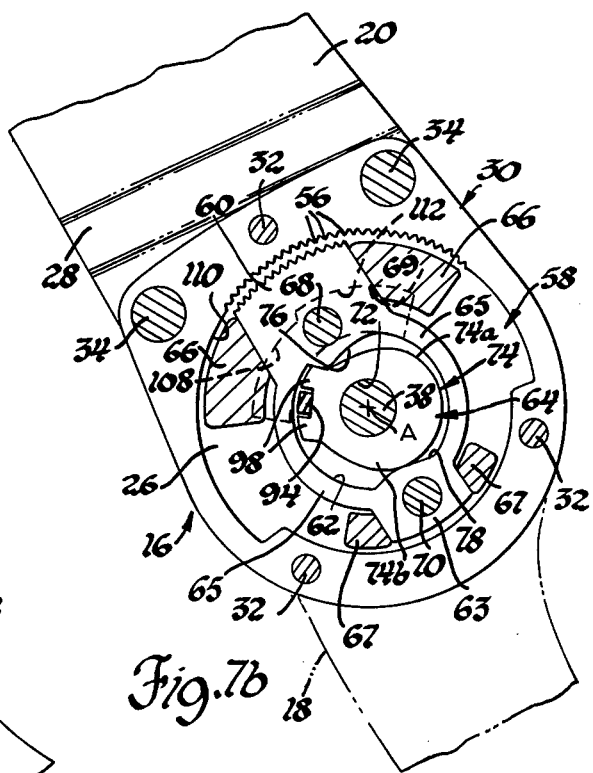
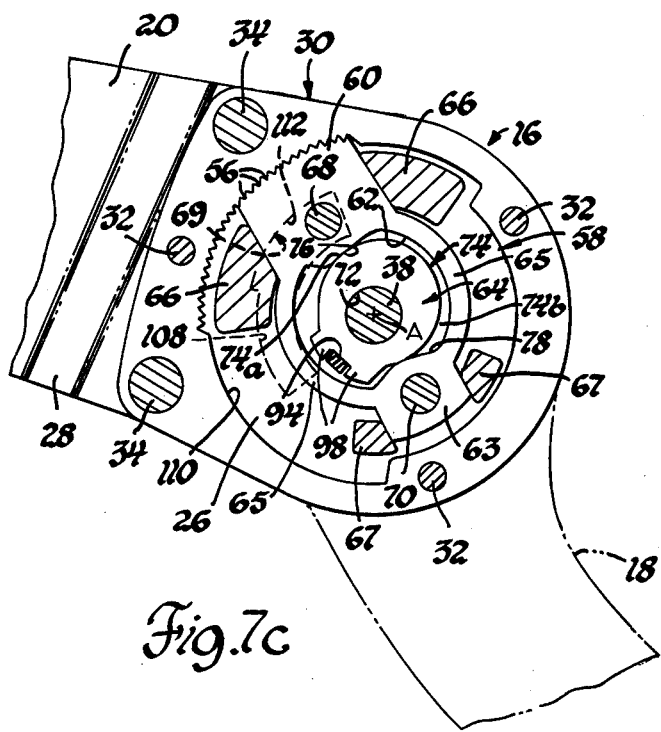
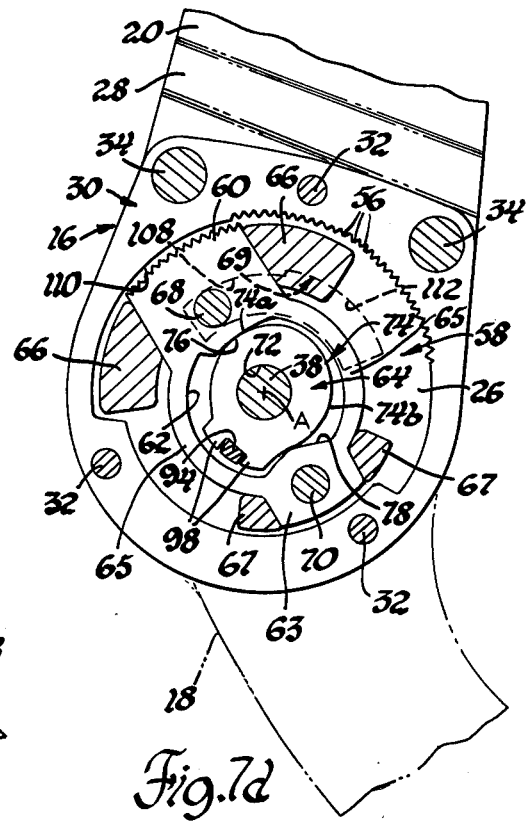

SEAT BACK RECLINER

BACKGROUND OF THE INVENTION

1. Field of the Invention

The present invention relates to recliners utilized with vehicle seats to provide adjustment of the angular position of seat backs relative to associated seat cushions in order to give seat occupants the desired seat back inclination.

2. Description of the Prior Art

Recliners have been utilized heretofore to adjust the angular position of a seat back relative to an associated seat cushion to provide the seat occupant with the desired seat back inclination for comfortable seating. One application where these recliners have been used extensively is in vehicle seats, particularly those of the front seat automotive type. One requirement of such recliners is that the angular position of the seat back be adjustable relative to the cushion for somewhere between approximately 30° to 45° of adjustment. Also, wherein the recliners are utilized with the front seats of the two door type vehicle body, the seat back must also be pivotally movable to a forward easy-enter position so passengers can enter or leave the rear seat behind the front seat. When utilized with vehicles, the seat recliners must be sufficiently durable to withstand continued use for many years without being too expensive to prevent commercial acceptance of the recliners by vehicle manufacturers. Also, the recliners must be relatively compact so they can be easily packaged with automotive seats.

Seats recliners are shown by the following patents: U.S. Pat. Nos. 2,311,105; 3,309,139; 3,511,534; 3,737,947; and 3,788,698; and French Pat. No. 1,296,060.

SUMMARY OF THE INVENTION

An object of the present invention is to provide an improved seat back recliner including a locking ring and a locking dog that is normally spring biased into toothed engagement with the ring to prevent pivoting of a seat back arm of the recliner relative to a seat cushion arm thereof, the dog being actuatable against the spring bias thereof to disengage the ring and permit pivotal adjustment of the seat back arm as well as movement thereof to a forward easy-enter position, and the dog being blocked from engagement with the ring during forward pivoting of the seat back arm to the easy-enter position to prevent wear of a toothed dog end that normally engages the locking ring.

In carrying out the above objects as well as other objects of the invention, the locking ring has a plate-like construction and is secured between plate-like ends of the seat cushion and seat back arms to the seat back arm end. Spaced guides that are formed by partial piercing the seat cushion arm end slidably guide the toothed dog end as well as a second dog end on an opposite side of the axis of the pivotal connection between the two arm ends. Blocking of the toothed dog end is achieved by a blocking pin mounted on the dog adjacent its toothed end and by a blocking surface on the seat back arm end. An arcuate slot in the seat back arm end defines the blocking surface and receives the blocking pin on the dog to provide the blocking action. Inwardly extending teeth of the locking ring are permitted to be engaged by the toothed dog end in a locking position of the dog except when the seat back arm is pivoted forwardly a sufficient extent so that the blocking action maintains the dog in a non-locking position out of engagement with the locking ring.

Between its ends, the locking dog defines an opening and includes connecting arms of partically circular shapes that open toward each other. A locking surface of the dog opening is located adjacent the toothed dog end and an unlocking surface thereof is located adjacent the second dog end on the opposite side of the pivotal axis from the locking surface. The locking surface has a slightly curved shape that is concave with respect to the pivotal axis while the unlocking surface has a rectilinear shape that is slightly inclined with respect to a line perpendicular to the direction of dog movement between the locking and nonlocking positions. An actuating cam is received within the dog opening between the locking and unlocking surfaces thereof and is pivotally supported on a shaft that extends along the pivotal axis between the plate-like ends of the seat cushion and seat back arms. An actuator pivotally supported on one end of the shaft has a projection that extends through a curved slot in the seat cushion arm to pivot the cam in opposite directions. A biasing spring of the actuator encircles the shaft and extends between the seat cushion arm end and the actuator so that the cam is urged in a pivotal direction that engages a surface thereof with the locking surface of the dog in order to normally bias the dog into toothed engagement with the locking ring. Manual actuation of the actuator pivots the cam in the opposite direction so that its surface engages the unlocking surface and thereby slides the dog to the nonlocking position where its toothed end disengages the locking ring to permit the seat back arm pivoting. A first lobe of the cam surface preferably moves into an overcenter relationship with the locking surface of the dog opening to detent the dog in the locking position with an overcenter action. A second lobe of the cam surface engages the unlocking surface of the dog opening to provide the movement of the dog to the nonlocking position. Between its lobes, the cam includes spaced lugs between which the actuator projection is received in order to provide pivoting of the cam on the shaft.

An opening of the seat cushion arm end has a shape that pivotally fixes the shaft thereto extending through the dog opening to support the cam and through a round opening in the seat back arm end in order to provide pivotal support between the arms. The end of the shaft opposite the one that supports the actuator is connected to a counterbalance spring that is also connected to the seat back arm in order to provide a forward counterbalancing of the seat back arm.

The objects, features and advantages of the present invention are readily apparent from the following detailed description of the preferred embodiment taken in connection with the accompanying drawings.

BRIEF DESCRIPTION OF THE DRAWINGS

FIGS. 7a, 7b, 7c and 7d are views taken in a direction similar to FIG. 5, FIG. 7a showing the recliner locked in its forwardmost seating position, FIG. 7b showing the recliner in the forwardmost seating position but unlocked, FIG. 7c showing the recliner locked in a fully reclined position; and FIG. 7d showing the recliner tipped forwardly to an easy-enter position.

DETAILED DESCRIPTION OF THE PREFERRED EMBODIMENT

Figure 1:
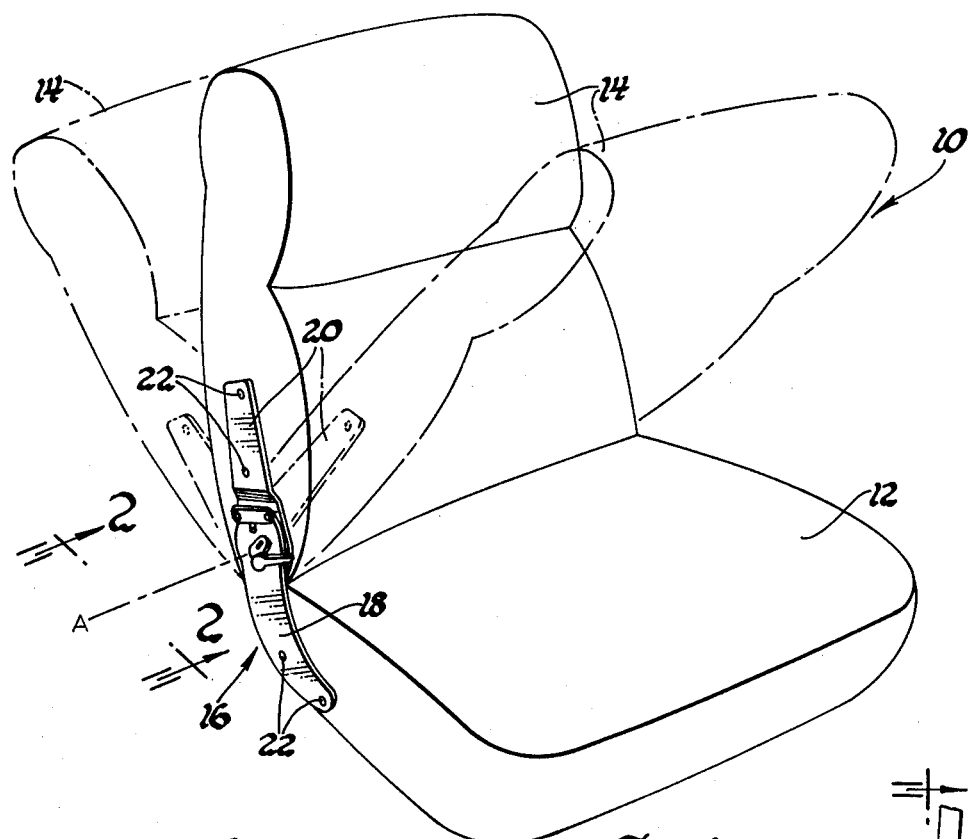
FIG. 1 is a perspective view of a vehicle seat incorporating a recliner constructed according to the present invention.

Referring to FIG. 1 of the drawings, a vehicle seat collectively indicated by 10 includes a generally horizontal seat cushion 12 and a vertically extending seat back 14 that have unshown frames for pivotally supporting the seat back about an axis A. Seat back 14 is movable from the vertical seating position shown by solid lines to a forwardly tipped easy-enter position and rearwardly inclined positions as shown by phantom lines. A seat recliner 16 constructed according to the present invention controls the pivotal movement of the seat back 14 with respect to the seat cushion 12 and includes seat cushion and seat back arms 18 and 20, respectively, secured to the associated seat component frames by suitable headed pins 22.

Figure 2:
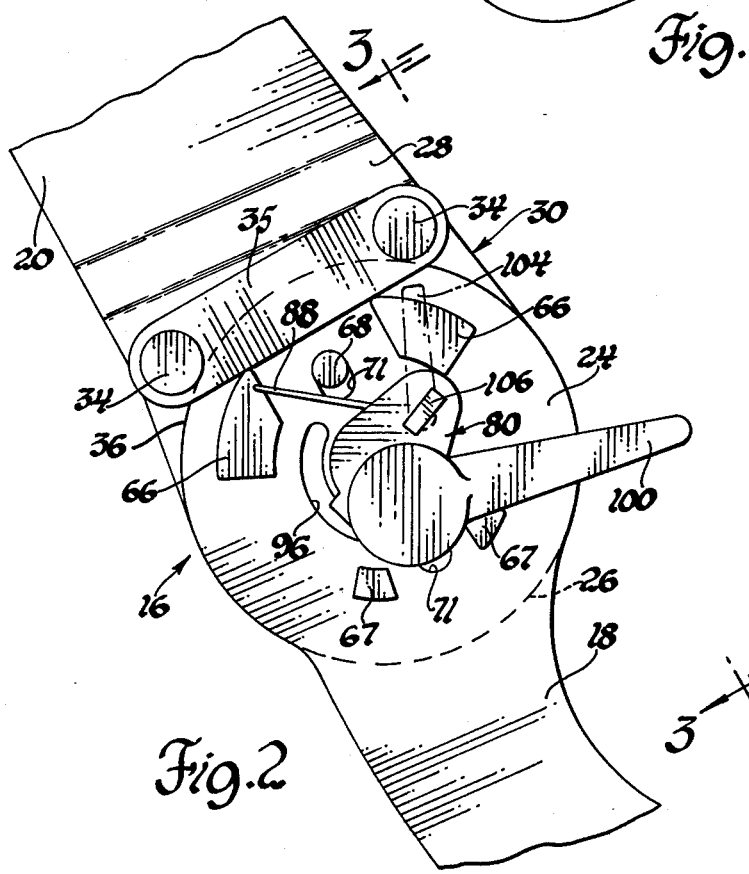
FIG. 2 is an enlarged side elevation view of the recliner taken along line 2—2 of FIG. 1.
Figure 3:
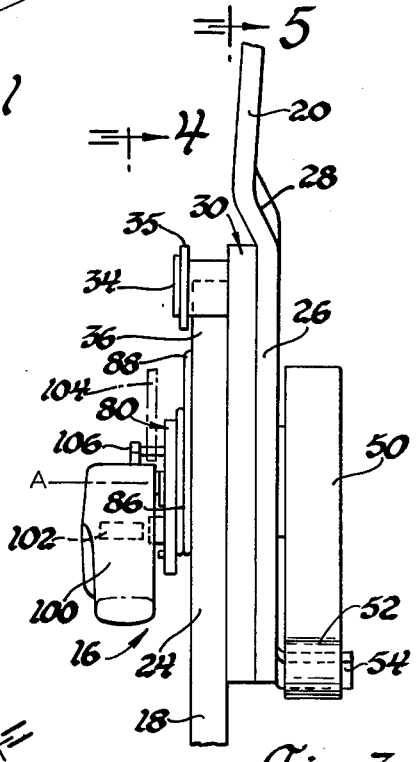
FIG. 3 is an end view of the recliner taken along line 3—3 of FIG. 2.

With additional reference to FIGS. 2 and 3, recliner arms 18 and 20 include respective plate-like ends 24 and 26 that are arranged in an opposed parallel relationship adjacent each other. Adjacent its end 26, seat back arm 20 includes an offset 28 so that the planes of both arms are generally coincident with each other. A plate-like locking ring 30 is located between the arm ends 24 and 26 in a sandwich relationship and is fixed to the seat back arm end 26 by small diameter pins 32 (see also FIG. 5) and by larger diameter pins 34 and a link 35 that extends between pins 34. Link 35 slidably engages the seat cushion arm end 24 adjacent its round peripheral edge portion 36 as the seat back arm pivots about axis A and the link thus prevents axial separation of the arms.

Figure 5:
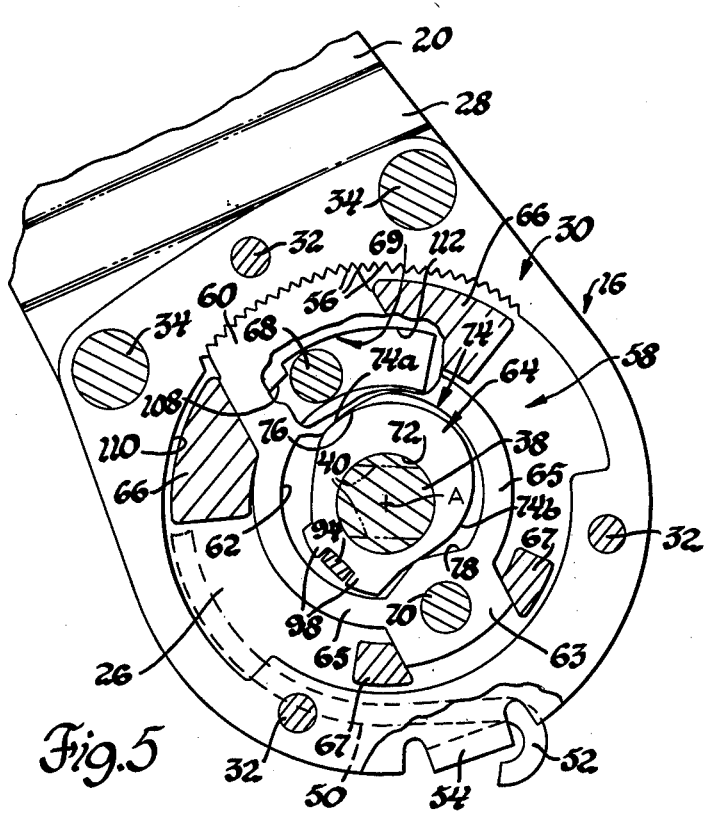
FIG. 5 is an enlarged sectional view of the recliner taken approximately along line 5—5 of FIG. 3.
Figure 6:
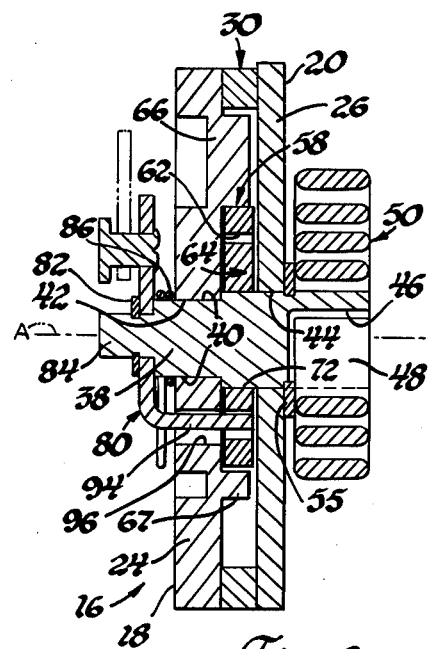
FIG. 6 is a sectional view through the recliner taken along line 6—6 of FIG. 4.

A shaft 38 of recliner 16 is shown in FIG. 6 as extending along the pivotal axis A between the plate-like arm ends 24 and 26. Shaft 38 includes a portion with radial flats 40 that are received within a complementary opening 42 in the seat cushion arm end 24 so as to be pivotally fixed relative to the seat cushion arm. A round opening 44 in the seat back arm end 26 rotatably receives the shaft 38 so that the seat back arm is pivotally supported by the shaft for movement about the axis A. At its FIG. 6 right-hand end, shaft 38 includes a slot 46 that receives the inner end 48 of a sprialling clock-type spring 50. As shown in FIG. 5, the outer end 52 of this spring is hooked over a flange 54 of the seat back arm end 26 such that the bias of the spring provides a forward counterbalancing of the seat back while located in rearwardly inclined positions. A split-type washer 55 (FIG. 6) is received within an annular groove in shaft 38 between spring 50 and the seat arm end 26. Washer 55 prevents axial movement of the arm end 26 outwardly along shaft 38 and thereby maintains this arm on the shaft.

As seen in FIG. 5, locking ring 30 includes inwardly extending locking teeth 56 arranged in an arcuate shape about the pivotal axis A. A plate-like locking dog 58 of the recliner has a toothed end 60 that is cooperable with the locking ring teeth 56 to selectively prevent pivotal movement between the seat cushion and seat back arms 18 and 20 as is more fully hereinafter described. Dog 58 must have a slightly lesser thickness than the locking ring 30 so that it is slidably supported between the cushion and seat back arm ends 24 and 26 for movement that positions its toothed end 60 in and out of engagement with the locking ring teeth 56. An opening 62 in dog 58 receives an actuating cam 64 that moves the dog during pivotal cam movement about axis A. On the opposite side of pivotal axis A from its toothed end 60, dog 58 includes a second end 63 that is connected to the toothed end by partially circular connecting arms 65 that have concave shapes opening toward each other. A pair of spaced guides 66 partially pierced into the seat cushion arm end 24 slidably support the toothed dog end 60 from movement toward and away from the locking teeth 56 while a second pair of spaced guides 67 on arm end 24 slidably support the second dog end 63. A blocking pin 68 of the toothed dog end is received within an arcuate slot 69 in the seat back arm end 26 to provide a blocking action that is described later. A guide pin 70 of the second dog end 63 and the blocking pin 68 are received within respective guide slots 71 (FIG. 4) in the seat cushion arm end to guide the dog for movement toward and away from the ring locking teeth 56 shown in FIG. 5.

Actuating cam 64, as seen in FIGS. 5 and 6, is received within the dog opening 62 and has a round opening 72 that rotatably receives the shaft 38 so that the cam is rotatable about axis A. An outer cam surface 74 of cam 64 is engagable with both a locking surface 76 of the dog opening and an unlocking surface 78 of this opening. Locking surface 76 is located adjacent the toothed dog end 60 and has a slightly curved shape that is concave with respect to the cam 64. Unlocking surface 78 is located adjacent the second dog end 63 and has a rectilinear shape that is slightly inclined with respect to a line perpendicular to the direction of dog movement between the spaced guides 66 and 67.

Figure 4:
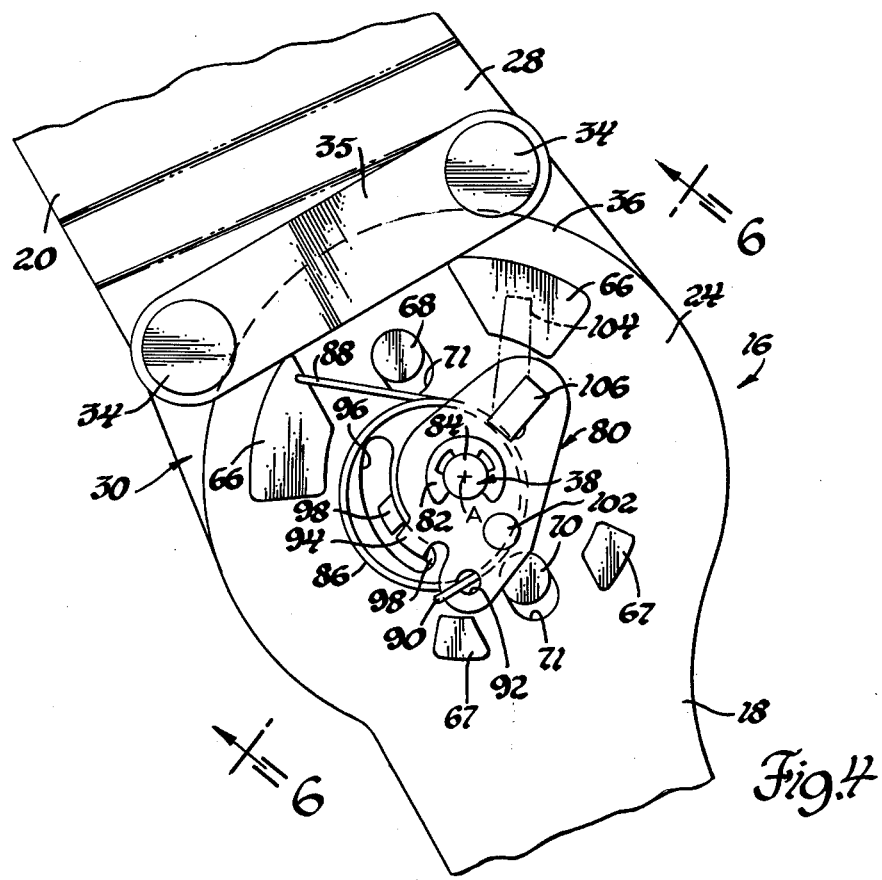
FIG. 4 is an enlarged view partially in section of the recliner taken approximately along line 4—4 of FIG. 3.

An actuator 80 of the recliner best seen in FIGS. 4 and 6 is provided in order to pivot the cam 64 and thereby move the dog between locking and nonlocking positions. A clip 82 pivotally secures the actuator 80 on a reduced diameter portion 84 of shaft 38 so that the actuator pivots about axis A. A relatively light bias spring 86 encircles the shaft 38 about axis A as shown in FIG. 4 and has one end 88 hooked to the seat cushion arm end 24 and another end 90 inserted through an aperture 92 in the actuator 80. The bias of spring 86 urges the actuator 80 in a counterclockwise direction about axis A. A bent projection 94 of actuator 80 extends inwardly through a curved slot 96 in the seat cushion arm end 24 and is received within spaced lugs 98 on the cam 64 such that the cam pivots in response to pivoting of the actuator.

As seen by combined reference to FIGS. 2 through 4, a manually actuated knob 100 secured to pin 102 on actuator 80 and a remote release 104 connected to a squared projection 106 on the actuator may be used to pivot the actuator. With the cam 64 located in the position of FIG. 5, dog 58 is in its locking position with its toothed end 60 engaging the ring teeth 56 and thereby preventing pivotal movement of the seat back arm 20 relative to the seat cushion arm 18. In the locking position, a lobe 74a of cam surface 74 is located in an over-center relationship with respect to dog locking surface 76 to the left of a center line between dog end pins 68 and 70. Consequently, forces acting on the seat back arm 20 tending to move the dog 58 away from its locking position with the toothed engagement shown tend to rotate the cam 64 counterclockwise to further wedge the dog into the locking position with a detenting action. When unlocking of the recliner is desired for adjustment, the cam 64 is pivoted clockwise by the actuator 80 so that its cam surface lobe 74a first moves to the right of the center line between the dog end pins 68 and 70 and then causes a second cam surface load 74b to slidably engage the unlocking dog surface 78 and slide the dog 58 to its nonlocking position where the toothed dog end 60 is out of engagement with the ring teeth 56. When this disengagement takes place, the seat back arm 20 is pivotally adjustable relative to the seat cushion arm 18. Subsequently, the bias of spring 86 moves the actuator and the cam 64 so that the dog 58 is moved thereby to the locking position while the cam moves into the overcenter relationship that detents the dog in position. With the recliner 16 positioned as shown in FIG. 7a, the locking dog 58 positions the seat back arm 20 in a full forward position with the cooperable overcenter locking action provided by the dog 58 and the cam 64 in the manner previously described. Clockwise rotation of the cam 64 unlocks the dog 58 as shown in FIG. 7b and then allows the seat back arm 20 to be pivoted relative to the seat cushion arm 18. For example, the seat back arm 20 may be pivoted to a fully reclined position as shown in FIG. 7c and then locked by subsequent counterclockwise rotation of cam 64 under the bias of the actuator spring 86 previously described. On the other hand, seat back arm 20 may also be pivoted forwardly to the easy-enter position of FIG. 7d from the unlocked condition of FIG. 7b so as to permit convenient access to the rear seat. Subsequently, rearward pivoting of the seat back from the easy-enter position of 7d causes the biasing spring 86 to again lock the dog 58 with the ring teeth 56.

As shown in FIG. 7d, the blocking pin 68 of dog 58 slidably engages a blocking surface 108 of the arcuate slot 69 in the seat back arm end 26 during pivoting of the seat back arm to the forward easy-enter position. Engagement between the blocking pin 68 and the blocking surface 108 prevents the toothed dog end from engaging a surface 110 on the ring 30 counterclockwise from the locking teeth 56. The normal bias of the actuating cam 64 in a counterclockwise direction due to the biasing spring 86 is thus prevented from engaging the toothed dog end 60 with the ring surface 110 and causing consequent tooth wear as the seat back arm 20 pivots to and from the forward easy-enter position. As the seat back arm 20 pivots rearwardly, the blocking pin 68 slides toward the clockwise end of blocking surface 108 and then off of the blocking surface onto the larger radius surface 112 so as to again permit engagement of the toothed dog end and the locking ring teeth 56.

While a preferred embodiment of the recliner has herein been illustrated in detail, those skilled in the art will recognize various alternative designs and embodiments for practicing the present invention as defined by the following claims.

What is claimed is:

1. a seat back recliner comprising: seat back and cushion arms having plate-like ends connected to each other for movement about a pivotal axis; a plate-like locking ring positioned between the arm ends fixed to one of the arm ends encircling the pivotal axis; said locking ring including inwardly extending teeth arranged in an arcuate shape about the pivotal axis; a plate-like locking dog slidably supported on the other arm end within the locking ring between the arm ends; said locking dog having a toothed end for engaging and disengaging the ring teeth; manually operable actuating means for moving the locking dog between a locking position where the toothed end thereof engages the ring teeth to prevent pivoting of the seat back arm and a nonlocking position where the toothed end thereof is disengaged from the ring teeth to allow pivotal adjustment of the seat back arm and movement thereof to a forward easy-enter position; and blocking means operatively associated between the locking dog and the arm end on which the locking ring is fixed to prevent engagement of the toothed dog end and the locking ring during the forward extend to pivotal movement of the seat back arm to and from the easy-enter position with the actuating means manually released.

2. A seat back recliner comprising: seat back and cushion arms having plate-like ends connected to each other for movement about a pivotal axis; a plate-like locking ring positioned between the arm ends fixed to one of the arm ends encircling the pivotal axis; said locking ring including inwardly extending teeth arranged in an arcuate shape about the pivotal axis; a plate-like locking dog slidably supported on the other arm end within the locking ring between the arm ends; said locking dog having a toothed end for engaging and disengaging the ring teeth; actuating means for moving the locking dog between a locking position where the toothed end thereof engages the ring teeth to prevent pivoting of the seat back arm and a nonlocking position where the toothed end thereof is disengaged from the ring teeth to allow pivotal adjustment of the seat back arm and movement thereof to a forward easy-enter position; blocking means cooperating between the dog and the arm end on which the ring is fixed to prevent engagement of the toothed dog end and the locking ring during the forward extent of pivotal movement of the seat back arm to and from the easy-enter position; and the blocking means including a blocking surface on the one arm end to which the ring is fixed and also including a dog pin for engaging the blocking surface to prevent engagement of the toothed dog end and the locking ring when the actuating means allows pivotal seat back arm movement to the easy-enter position.

3. A recliner as claimed in claim 2 wherein the one arm end to which the locking ring is fixed includes an arcuate slot that defines the blocking surface.

4. A recliner as claimed in claim 2 wherein the actuating means includes an actuator pivotal about the axis and having a bent projection, a curved slot in the other arm end opposite the arm end to which the locking ring is fixed, said bent projection of the actuator extending through the curved slot, and a cam located between the arm ends and pivoted by the actuator projection to move the dog between the locking and nonlocking positions.

5. A recliner as in claim 4 further including a shaft projecting through the arm ends along the pivotal axis, means pivotally supporting the actuator on the shaft, and a biasing spring extending about the shaft and between the actuator and the other arm end to bias the actuator and cam so as to normally position the dog in the locking position.

6. A recliner as in claim 5 wherein the cam has a round opening through which the shaft extends, the dog having an opening that receives the cam, a second dog end on the opposite side of the pivotal axis from the toothed dog end, and partially circular arms that connect the dog ends while being concave toward each other.

7. A recliner as in claim 6 further including means pivotally fixing the shaft to the seat cushion arm, and a counterbalance spring that extends between the shaft and the seat back arm to bias the seat back arm in a forward direction.

8. A recliner as in claim 6 wherein the dog opening defines a locking surface between the arms adjacent the toothed dog end and defines an unlocking surface between the arms adjacent the second dog end, said cam including a surface with a first lobe that moves into an overcenter relationship with the dog locking surface to detent the dog in the locking position upon movement of the actuator in one direction under the force of the biasing spring, and the cam surface including a second lobe that engages the unlocking dog surface to move the dog to the nonlocking position upon movement of the actuator in the opposite direction against the biasing spring.

9. A recliner as in claim 8 wherein the cam includes a pair of spaced lugs between the first and second lobes of the cam surface, and the actuator projection being received between the spaced lugs to pivot the cam about the shaft.

10. A recliner as in claim 8 wherein the locking dog surface has a slightly curved shape that is concave with respect to the cam, and the unlocking dog surface having a rectilinear shape.

11. A recliner as in claim 5 wherein the arm end opposite the arm end to which the locking ring is secured includes pairs of spaced guides that are formed by partial piercing on opposite sides of the pivotal axis, the toothed and second dog ends being slidably guided between the spaced guides.

12. A seat back recliner comprising: seat back and cushion arms having plate-like ends; a shaft pivotally connecting the arms ends for movement relative to each other about a pivotal axis; a plate-like locking ring positioned between the arm ends fixed to the seat back arm end; said locking ring encircling the pivotal axis and including inwardly extending locking teeth arranged in an arcuate shape about the axis; a plate-like locking dog slidably supported between the arm ends and including a first toothed end and a second end on opposite sides of a pivotal axis; the seat cushion arm end having spaced guides that support the first and second dog ends to permit sliding dog movement between locking and nonlocking positions; said locking dog having an opening between the ends thereof through which the shaft extends; the locking dog opening having a locking surface adjacent the toothed dog end and an unlocking surface adjacent the second dog end; a cam pivotally supported on the shaft between the arm ends within the opening of the locking dog; the cam having a surface that is engageable with the locking and unlocking dog surfaces upon cam pivoting in opposite directions to move the dog between the locking position where the toothed dog end engages the ring teeth to prevent seat back arm pivoting and the nonlocking position where the tooth dog end disengages the ring teeth to permit pivotal adjustment of the seat back arm and movement thereof to a forward easy-enter position; an actuator pivotally supported on the shaft on the opposite side of the seat cushion arm end from the seat back arm end; a curved slot in the seat cushion arm end adjacent the actuator; a projection on the actuator that extends through the curved slot to pivot the cam upon pivoting of the actuator; a biasing spring that encircles the shaft and extends between the seat cushion arm end and the actuator to bias the actuator in a direction that pivots the cam to move the dog to the locking position; a blocking pin on the dog; an arcuate slot in the seat back arm end; the blocking pin being received within the arcuate slot; and the arcuate slot including a blocking surface that cooperates with said blocking pin to prevent the biasing spring from biasing the toothed dog end into engagement with the locking ring through the actuator and the cam during the forward extent of pivotal movement of the seat back arm to and from the easy-enter position.

13. A seat back recliner as in claim 12 wherein the seat cushion arm end includes an opening that receives and fixes the shaft thereto, a counterbalance spring extending between the shaft and the seat back arm end on the opposite side of the seat back arm end from the seat cushion arm end.

14. A seat back recliner as in claim 12 wherein the blocking pin of the dog is located at the toothed dog end, the locking surface adjacent the toothed dog end having a curved shape that is concave with respect to the cam, and the unlocking surface adjacent the second dog end having a rectilinear shape that is slightly inclined from a line perpendicular to the direction of dog movement between the locking and nonlocking positions.

* * * * *

UNITED STATES PATENT OFFICE
CERTIFICATE OF CORRECTION

Patent No. 4,082,352      Dated April 4, 1978

Inventor(s) Emmett R. Bales and Randal T. Murphy

It is certified that error appears in the above-identified patent and that said Letters Patent are hereby corrected as shown below:

Column 2, line 5 "partically" should be --partially--.

Column 5, line 60 "a" should be --A--.

Column 6, line 13 "extend to" should be --extent of--.

Signed and Sealed this

Twenty-fourth Day of October 1978

[SEAL]

Attest:

RUTH C. MASON  
Attesting Officer

DONALD W. BANNER  
Commissioner of Patents and Trademarks